United States Patent [19]
Allen, Jr.

[11] Patent Number: 5,299,196
[45] Date of Patent: Mar. 29, 1994

[54] DISTRIBUTED ADDRESS DECODING FOR BUS STRUCTURES

[75] Inventor: James J. Allen, Jr., Raleigh, N.C.

[73] Assignee: International Business Machines Corporation, Armonk, N.Y.

[21] Appl. No.: 974,654

[22] Filed: Nov. 12, 1992

[51] Int. Cl.⁵ .............................................. H04J 3/02
[52] U.S. Cl. ..................................... 370/85.1; 370/67
[58] Field of Search ................... 370/85.2, 85.1, 94.1, 370/94.2, 85.6, 100.1, 92, 67

[56] References Cited

U.S. PATENT DOCUMENTS

| | | |
|---|---|---|
| 4,577,314 | 3/1986 | Chu et al. ............................ 370/94.1 |
| 4,939,729 | 7/1990 | Weisser .................................. 370/112 |
| 5,083,269 | 1/1992 | Syobatake et al. ................. 370/85.6 |

Primary Examiner—Douglas W. Olms
Assistant Examiner—Ajit Patel
Attorney, Agent, or Firm—Stephen T. Keohane

[57] ABSTRACT

A method and an apparatus decodes the address of a selected destination user in a time-distributed manner thereby allowing a faster bus cycle and providing earlier error detection. The method and system of the present invention provides for the distribution of the address decoding over two bus cycles, rather than one, so that a faster bus cycle is allowed. In addition, the present invention provides address decode circuitry within the bus arbitrator/controller so that address decoding and error detection can be performed in parallel with bus arbitration.

13 Claims, 4 Drawing Sheets

DISTRIBUTED ADDRESS DECODING FOR BUS STRUCTURES

BACKGROUND OF THE INVENTION

I. Field of the Invention

The present invention relates to the transfer of data within a system and more particularly to synchronous data transfer between users in a system having a shared data bus wherein address decoding is done in parallel with data transfer so that the transfer speed is enhanced.

II. Prior Art

In today's complex data communications equipment, many functions are linked together by various types of address and data bus structures. For example, as shown in FIG. 1, communications equipment 10 acts as an interface between a communications network 12 and a host 14. Communications equipment 10 comprises a number of modules, or users, each of which performs a different function. In this example, communications equipment 10 consists of a network interface module 16 and a host interface module 18 for interfacing with the communications network 12 and the host 14, respectively, a microprocessor 20 for providing control, two random access memories, RAM 1 22 and RAM 2 24, for storage, a clock generator 25 for generating system clock signals for the users, and a bus arbitrator/controller 26 for controlling the transfer of data within the communications equipment 10.

The users are interconnected within equipment 10 for data transfer by a data bus 28. The data bus 28 is normally a parallel bus structure of a predetermined number of bits in width. For instance, the data bus could be 18 bits wide, 16 bits being reserved for data and two bits being reserved for parity.

Control lines 30 extend between the users for conveying various messages therebetween. For example, each user vies, or bids, for use of the data bus 28 in order to send/receive information to/from a second user. For simplicity, in this document, the bidding user will be designated the "source" user and the second user will be designated the "destination" user although the data may be moving in either direction. Bus arbitrator/controller 26 determines which source user has the highest priority and sends a select signal (via control lines 30) to that source user allowing it exclusive access to the data bus for the next data transfer. In addition, bus arbitrator/controller 26 sends a R/W signal to the destination user indicating whether the transfer is to be a read or a write operation.

Destination user address lines 32 connected from the various source users to the bus arbitrator/controller are used to convey, from each source user, the address of the destination user with which it wishes to exchange information. The address of the corresponding destination user is conveyed by the bus arbitrator/controller to the selected destination user via selected destination user address bus 34.

One or more system clock signals are conveyed to the users from the clock generator (CLOCK GEN 25) via clock lines 33.

FIG. 2 illustrates a block diagram of circuitry which could be used in a bus arbitrator/controller 26 in a system having four users. Bus arbitrator/controller 26 consists of a multiplexer (MUX 36), a second multiplexer (MUX 38), and an arbitrator 40. MUX 36 receives destination user addresses via destination user address lines 32a, 32b, 32c, and 32d from each of the users in the system. Control lines 42 from arbitrator 40 indicate to MUX 36 which address should be selected. The selected address is output via selected destination user address bus 34.

MUX 38 receives the read/write (R/W) select lines 30a, 30b, 30c, and 30d from the users. These lines indicate whether the proposed operation by the source user will be a read or write operation with the destination user. Control lines 42 from arbitrator 40 indicate to MUX 38 which source user's R/W line is to be selected and the corresponding signal is output via control line 30e.

Arbitrator 40 receives bids for use of the data bus from the respective source users via source user bid lines 30f, 30g, 30h, and 30i. The arbitrator 40 determines which of the bidding users has the highest priority and selects the corresponding user via user select lines 30j, 30k, 30l, and 30m.

As discussed above, the data transfer amongst the users is synchronous, i.e., there is a continuous clock, or system clock, provided to each user and data is transferred in accordance with predetermined clock cycles. In many cases, the data transfer is accomplished by utilizing the system clock so that, during alternating clock cycles, the data bus is arbitrated or data is transferred between the users. In other words, during a first clock cycle, source users wishing to send or receive data over the data bus bid for exclusive use of the data bus and the bus arbitrator/controller determines which of the users bidding for use of the data bus has the highest priority. This is sometimes called the "arbitration cycle". During the next clock cycle, or the "data transfer cycle", the selected source user is notified via its user select line, the address of the destination user is sent over selected destination user address bus 34, and the data is transferred between the source and destination users. The following cycle is an arbitration cycle for the following data transfer cycle and so forth.

In some systems, time is saved by combining the data transfer of one cycle with the bus arbitration of the following cycle. In this manner, the total necessary time for arbitration/data transfer is reduced as the bus arbitration for the next data transfer cycle is being done in parallel with the present data transfer. An example of such a system is illustrated in the timing diagrams of FIG. 3.

In the example illustrated in FIG. 3, SYSTEM B CLOCK is providing the timing to the system, i.e., the rising edge of the SYSTEM B CLOCK represents the start of a new cycle. In the example, two users, Source User #1 and Source User #2, are each bidding for exclusive use of the data bus, Source User #1 having priority over Source User #2. As shown, both Source User #1 and Source User #2 Bid lines (corresponding to lines 30f and 30g of FIG. 2) go high during the first system clock cycle 50. Because Source User #1 has priority over Source User #2, the bus arbitrator/controller selects Source User #1 as indicated by the Source User #1 Select line (corresponding to line 30j, of FIG. 2). Destination user address 1 is multiplexed to the selected destination user address bus 34 by MUX 36 (FIG. 2).

During the following clock cycle 52, Source User #1 data is transferred, either sent or received by Source User #1, depending upon its R/W line. During that same clock cycle, Source User #2 is selected by bus arbitrator/controller as indicated by the Source User

2 Select line (corresponding to line 30k of FIG. 2). Data transfer for Source User #2 occurs during the next clock cycle 54 when the data is transmitted to/from the selected destination user at address destination user address 2.

As shown in the figure, Source User #1 again bids for access to the data bus during clock cycle 54 and is able to transmit/receive data during the following cycle 56. In this manner no clock cycles, except the initial clock cycle, are wasted by bus arbitration, i.e., data is being transferred during all clock cycles where there is data to be transferred.

There is a problem, however, which significantly slows the data transfer via the internal data bus of such systems. In many cases, after the selected destination user receives its address off the selected destination user address bus (34), address decoding must still be performed by the selected destination user prior to the data transfer. For instance, where the destination user comprises a group of registers, the address needs to be decoded into register selects. Also, some internal registers contain parity and others do not, i.e., a source user (register) having parity will send to a destination user (register) 16 bits of data plus two parity bits, while a source register having no parity will send just the 16 data bits. For those registers that do contain parity, parity is generated by the source register and checked by the destination register against existing parity. For those that do not contain parity, the parity checking mechanism has to be disabled. The destination user comprises the specific decode logic it requires to disable its parity checking mechanism.

Another example is where the destination user contains one or more RAMs and RAM selects must be generated from the address. For example, where a destination user contains a local store, a data buffer, a low instruction RAM, and a high instruction RAM, the following selects may be generated by decoding the selected destination user address: a local store select; a data buffer select; a low instruction RAM select; and a high instruction select. These RAM selects are generated by decode logic in the destination user.

In addition, the address must be verified that it is a valid address. For instance, an error code will be generated if the address indicates a write to a read-only address, a read to a write-only address or a write to protected storage.

The problem is that these and other address decodes consume time during the data transfer cycle which could otherwise be used for transferring data between users. Consequently, a longer data transfer cycle is required so that the various decodes may be performed and the data may be transferred.

SUMMARY OF THE INVENTION

The present invention comprises a method and a system for decoding the address of a selected destination user in a distributed manner thereby allowing a faster bus cycle and providing earlier error detection. The method and system of the present invention provides for the distribution of the address decoding over two bus cycles, rather than one, so that a faster bus cycle is allowed. In addition, the present invention provides address decode circuitry within the bus arbitrator/controller so that address decoding and error detection can be performed in parallel with bus arbitration.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

Figure 1:
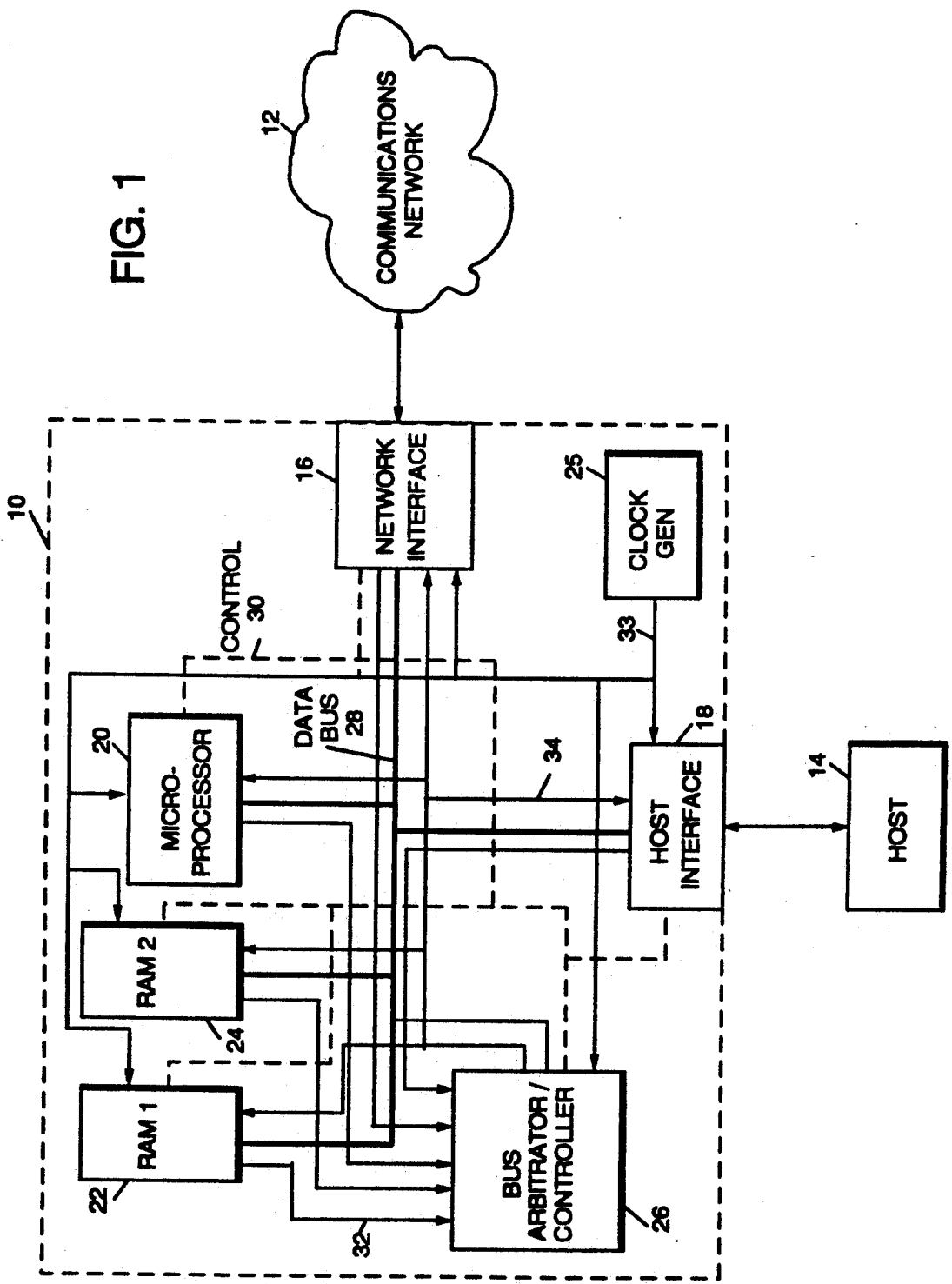
FIG. 1 is a block diagram of a system having a bus structure which may utilize the system and method of the present invention.
Figure 2:
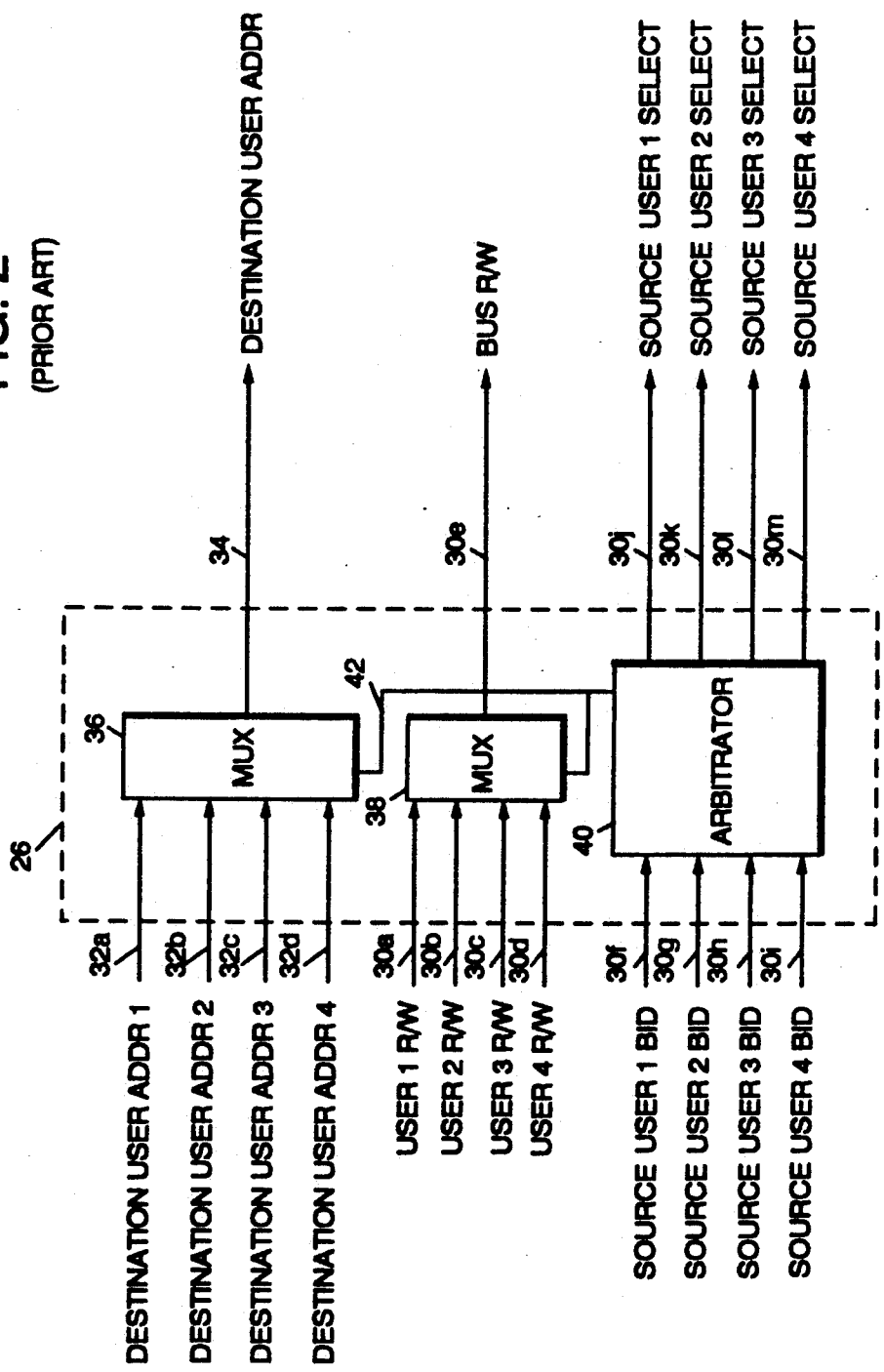
FIG. 2 is a block diagram of a bus arbitrator/controller of the prior art.
Figure 4:
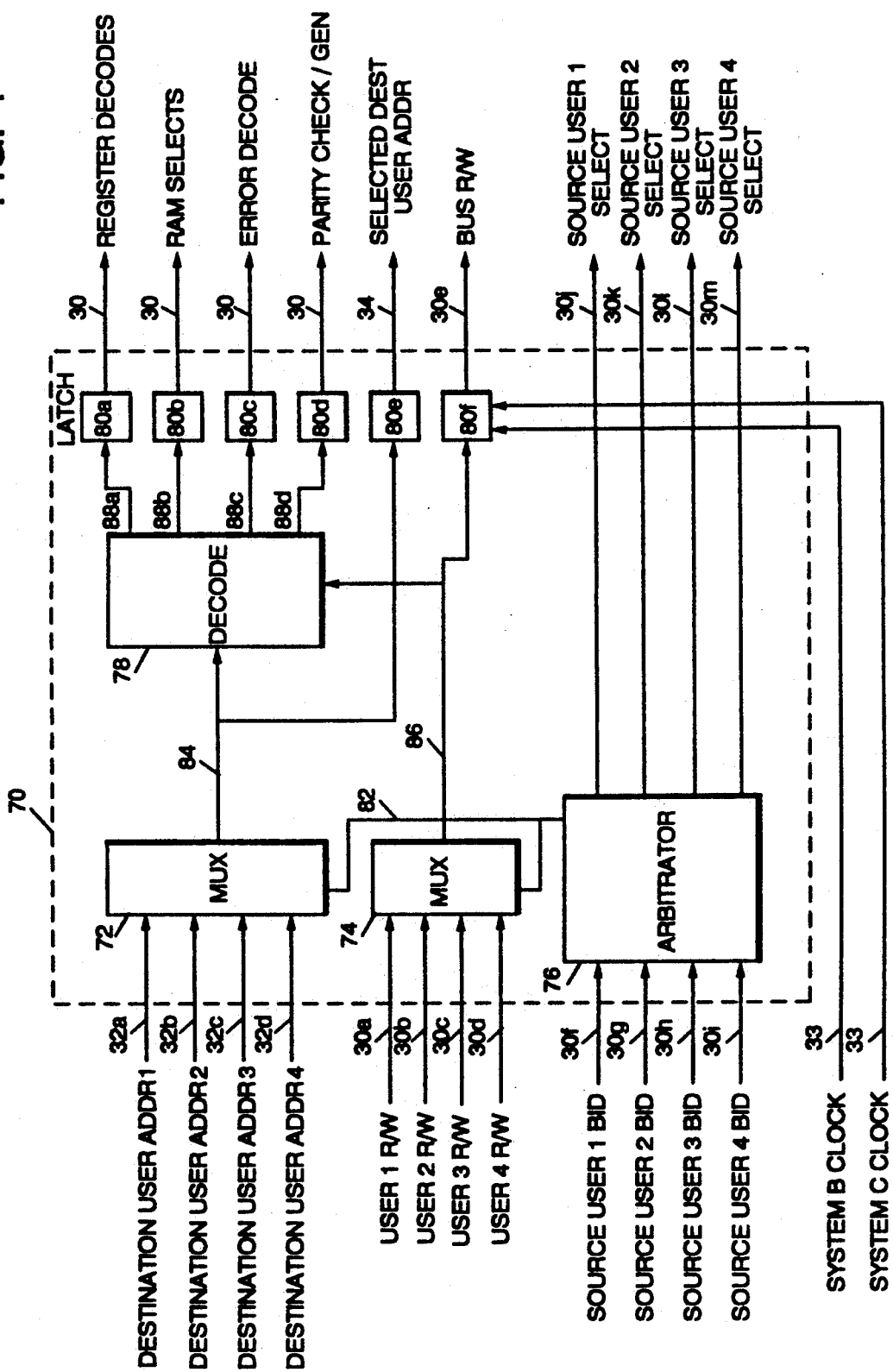
FIG. 4 is a block diagram of the bus arbitrator/controller of the present invention.

FIG. 4 illustrates, in block diagram form, a bus arbitrator/controller 70 embodying the distributed address decoding circuitry of the present invention. As discussed above, the bus arbitrator/controller 70 is utilized in a system having a shared data bus structure as illustrated in FIG. 1. In a shared data bus structure, "source users" of the data bus bid for exclusive use of the bus. The bus arbitrator/controller 70 determines which source user has the highest priority and selects that source user to send/receive data on the data bus to/from the desired second user, or "destination user". In the present case, as an example, there are four data bus users. This number of users is used to illustrate the concepts of the invention as any number of data bus users could selected and the invention would function equivalently.

As shown in FIG. 4, bus arbitrator/controller 70 consists of a multiplexer (MUX 72), a second multiplexer (MUX 74), an arbitrator 76, a decoder (DECODE 78) and a plurality of latches, in this case, six latches 80a, 80b, 80c, 80d, 80e and 80f. Also, bus arbitrator/controller 70 receives two clock signals from the clock generator, SYSTEM CLOCK B and SYSTEM CLOCK C. These will be discussed in greater detail below.

Arbitrator 76 receives bids for use of the data bus from each of the respective four users via source user bid lines 30f, 30g, 30h, and 30i. Arbitrator 76 determines which of the bidding users has the highest priority and selects the corresponding user via user select lines 30j, 30k, 30l, and 30m. In addition, arbitrator 76 generates control signals for use by MUX 72 and MUX 74 and outputs these signals to control lines 82. These control signals indicate to MUX 72 and MUX 74 as to which input signals are to be multiplexed out.

MUX 72 receives destination user addresses via destination user address lines 32a, 32b, 32c, and 32d from each of the four data bus users in the system. The destination user addresses represent the addresses of the destination users with which the source users wish to transfer data. Control lines 82 from arbitrator 76 indicate to MUX 72 which address should be selected. The selected address is input to DECODE 78 and latch 80e via internal destination user address bus 84.

MUX 74 receives the read/write (R/W) select lines 30a, 30b, 30c, and 30d from the users. These lines indicate whether the proposed operation by the bidding, or source, user will be a read or write operation with the destination user. Control lines 82 from arbitrator 76 indicate to MUX 74 which source user's R/W line is to be selected and the corresponding signal is input to DECODE 78 and to latch 80f via control line 86.

DECODE 78 receives the destination user address from MUX 72 for providing an initial decoding function for the system. DECODE 78 comprises decode logic for decoding the address and providing any number of desired outputs. In the present case, DECODE 78 provides four groups of outputs: register decodes 88a; RAM selects 88b; error decodes 88c; and a parity check/gen 88d. The decode logic provided by DECODE 78 is similar to the logic which is normally provided by the destination users of the system. For example, where a particular destination user has a plurality of registers, it must decode the destination user address to generate register decodes. Using the bus arbitrator/controller 70 of the present invention, these register decodes are provided by the bus arbitrator/controller 70 so that this decoding operation is completed prior to the data transfer cycle.

Similarly, DECODE 78 decodes the destination user address to provide RAM selects 88b. Normally, a destination user having more than one RAM must decode the destination user address and generate RAM selects for selecting the particular RAM being written to or read from. As with the register decodes, the RAM selects are provided by the bus arbitrator/controller 70 to the selected destination user along with the destination user address during the data transfer cycle so that the time normally required by the destination user to decode the address and generate the selects is saved. This time savings allows the data transfer cycle to be shortened and allows an overall faster bus cycle.

The same is true for the remaining two DECODE 78 outputs: error decodes 88c and parity check/gen 88d. As discussed previously, the error decodes indicate whether the destination address is valid or invalid. Normally, this operation is performed by the users during the data transfer cycle. In contrast, in the present invention, the address is decoded during the arbitration cycle and, therefore, an error, if one occurs, can be detected earlier.

The parity check/gen signal 88d relates to destination users having one or more registers. Some registers have parity generating capability with respect to the transmitted data. Others do not. For those registers that contain parity, the parity is regenerated and checked against the existing parity. For those registers that do not contain parity, the parity checking mechanism is disabled. The parity check/gen signal 88d indicates to the destination user whether the parity should be checked or whether the parity checking mechanism should be disabled. Again, this operation is normally performed during the data transfer cycle. Using the bus arbitrator/controller 70 of the present invention, however, this operation is performed during the arbitration cycle thereby saving time normally spent during the data transfer cycle.

Figure 3:
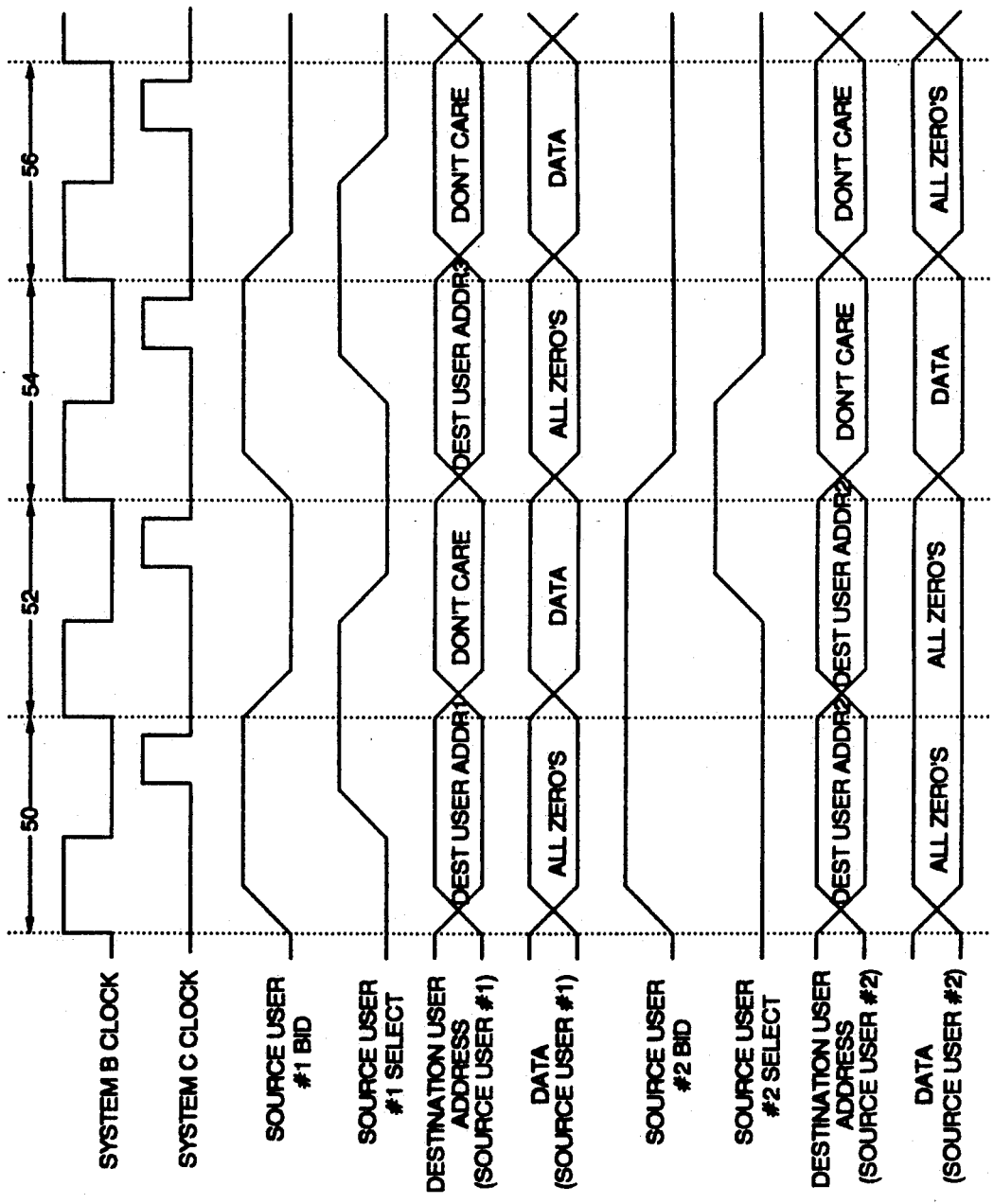
FIG. 3 is a timing diagram showing the data bus control signals, selected destination user addresses, and system clock signals for the transfer of data over the data bus of FIG. 1.

These decoded signals from DECODE 78, as well as the destination user address and the R/W signals, are input into latches 80a, 80b, 80c, 80d, 80e and 80f. The latches are used so that the signals are output to the selected destination user at the proper time. As can be seen, latches 80a, 80b, 80c, 80d, 80e and 80f receive both SYSTEM CLOCK B and SYSTEM CLOCK C, SYSTEM CLOCK C being used to clock the signals into the latches while SYSTEM CLOCK B is used for clocking the signals out of the latches. The relative characteristics of SYSTEM CLOCK B and SYSTEM CLOCK C are shown in the timing diagrams of FIG. 3.

Thus, the method and apparatus of the present invention provides address decoding during the arbitration cycle by generating signals such as register decodes and RAM selects. This minimizes address decoding time during the data transfer cycle and, as a result, devices on the data bus are selected earlier during the data transfer cycle thereby reducing the overall bus cycle time. Because all decoding accomplished during the arbitration cycle is centralized and not distributed to each user, duplicate decoding logic is not required and cell count is minimized. In addition, certain error conditions can be detected earlier in the arbitration cycle before data transfer occurs.

While the invention has been particularly shown and described with reference to preferred embodiments thereof, it will be understood by those skilled in the art that various other changes in form and detail may be made without departing from the spirit and scope of the invention.

What is claimed is:

1. A communication system comprising:
   a plurality of users;
   a common data bus connected to said users for conveying data between said users;
   each of said users having a unique address on said data bus, each of said users further having means for requesting to use said data bus for communicating with a destination user on said data bus and for outputting the address of said requested destination user;
   means, connected to each of said users, for generating and supplying to each of said users a system clocking signal having a bus arbitration cycle during which the use of said data bus is arbitrated between said users requesting access to said data bus and a data transfer cycle during which data is transferred between a selected user and its respective destination user;
   means, connected to each of said users, for arbitrating the use of said data bus, said arbitrating means comprising:
     means for receiving from requesting users, during said bus arbitration cycle, requests to use said data bus for communicating with said respective destination users;
     means for selecting, during said bus arbitaration cycle, one of said requesting users to access said bus; and
     means for generating an output indicative of said selected requesting user;
   means, connected to each of said users and said arbitrating means, for receiving the addresses of said destination users from said requesting users, for selecting, based upon said selected requesting user output, a destination user to communicate with said selected requesting user over said data bus, and for outputting, during said data transfer cycle, the address of the selected destination user; and
   means, connected to said address receiving means, for decoding the address of said selected destination user and for providing one or more outputs for and required by said selected destination user during said bus arbitration cycle, said decoding means outputs being based upon and decoded from said selected destination user address.

2. The communication system defined in claim 1 wherein said decoding means outputs are indicative of whether there is an addressing error.

3. The communication system defined in claim 1 wherein said decoding means outputs are indicative as to which of a plurality of registers in said selected destination user is being addressed by said selected requesting user.

4. The communication system defined in claim 1 wherein said decoding means outputs are indicative as to which of a plurality of RAMs in said selected destination user is being addressed by said selected requesting user.

5. The communication system defined in claim 1 wherein said decoding means outputs are indicative as to whether a parity checking mechanism in said selected destination user should be disabled.

6. The communication system defined in any of claims 1-5 further comprising a plurality of latches for temporarily storing said decoding means outputs during said bus arbitration cycle and for forwarding said decoding means outputs to the selected destination user during said data transfer cycle.

7. The communication system defined in claim 1 wherein said plurality of users comprise one or more RAMs, a microprocessor, a host interface and a network interface.

8. For use in a communication system comprising a plurality of users, a common data bus connected to said users for conveying data between said users, each of said users having a unique address on said data bus, each of said users further having means for requesting to use said data bus for communicating with a destination user on said data bus and for outputting the address of said requested destination user, and a system clock, connected to each of said users, for generating and supplying to each of said users a system clocking signal having a bus arbitration cycle during which the use of said data bus is arbitrated between said users requesting access to said data bus and a data transfer cycle during which data is transferred between a selected user and its respective destination user, a bus arbitrator, connected to each of said users, for arbitrating the use of said data bus, said bus arbitrator comprising:

means for receiving from requesting users, during said bus arbitration cycle, requests to use said data bus for communicating with said respective destination users;

means for selecting, during said bus arbitration cycle, one of said requesting users to access said bus; and means for generating an output indicative of said selected requesting user;

means, connected to each of said users, for receiving the addresses of said destination users from said requesting users, for selecting, based upon said selected requesting user output, a destination user to communicate with said selected requesting user over said data bus, and for outputting, during said data transfer cycle, the address of the selected destination user; and means, connected to said address receiving means, for decoding the address of said selected destination user and for providing one or more outputs for and required by said selected destination user during said bus arbitration cycle, said decoding means outputs being based upon and decoded from said selected destination user address.

9. The bus arbitrator defined in claim 8 wherein said decoding means outputs are indicative as to whether there is an addressing error.

10. The bus arbitrator defined in claim 8 wherein said decoding means outputs are indicative as to which of a plurality of registers in said selected destination user is being addressed by said selected requesting user.

11. The bus arbitrator defined in claim 8 wherein said decoding means outputs are indicative as to which of a plurality of RAMs in said selected destination user is being addressed by said selected requesting user.

12. The bus arbitrator defined in claim 8 wherein said decoding means outputs are indicative as to whether a parity checking mechanism in said selected destination user should be disabled.

13. The bus arbitrator defined in any of claims 8-12 further comprising a plurality of latches for temporarily storing said decoding means outputs during said bus arbitration cycle and for forwarding said decoding means outputs to the selected destination user during said data transfer cycle.

* * * * *